(12) United States Patent
Ebergen et al.

(10) Patent No.: US 10,289,386 B2
(45) Date of Patent: May 14, 2019

(54) ITERATIVE DIVISION WITH REDUCED LATENCY

(71) Applicant: Oracle International Corporation, Redwood City, CA (US)

(72) Inventors: Josephus Ebergen, San Francisco, CA (US); Christopher Olson, Austin, TX (US); Dmitry Nadehzin, Moscow (RU); David Rager, Austin, TX (US); Austin Lee, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/122,724

(22) PCT Filed: Apr. 21, 2016

(86) PCT No.: PCT/RU2016/000233
§ 371 (c)(1),
(2) Date: Aug. 31, 2016

(87) PCT Pub. No.: WO2017/184011
PCT Pub. Date: Oct. 26, 2017

(65) Prior Publication Data
US 2017/0308356 A1   Oct. 26, 2017

(51) Int. Cl.
| | | |
|---|---|---|
| G06F 7/499 | (2006.01) | |
| G06F 7/523 | (2006.01) | |
| G06F 5/01 | (2006.01) | |
| G06F 17/17 | (2006.01) | |

(52) U.S. Cl.
CPC ............... G06F 7/523 (2013.01); G06F 5/01 (2013.01); G06F 17/17 (2013.01)

(58) Field of Classification Search
None
See application file for complete search history.

(56) References Cited

U.S. PATENT DOCUMENTS

| | | |
|---|---|---|
| 5,341,321 A | 8/1994 | Karp |
| 6,397,238 B2 | 5/2002 | Oberman |
| 7,167,887 B2 | 1/2007 | Kurd |
| 9,552,189 B1* | 1/2017 | Langhammer .......... G06F 7/483 |
| 2005/0144213 A1 | 6/2005 | Simkins |
| 2013/0290685 A1 | 10/2013 | Corbal San Adrian |
| 2014/0046996 A1 | 2/2014 | Rumyantsev |
| 2017/0199726 A1* | 7/2017 | Anderson ................ G06F 7/57 |
| 2017/0308356 A1* | 10/2017 | Ebergen ................ G06F 7/523 |

OTHER PUBLICATIONS

Search Report and Written Opinion in application No. PCT/RU2016/000233 dated Nov. 3, 2016.

* cited by examiner

*Primary Examiner* — David H Malzahn
(74) *Attorney, Agent, or Firm* — Meyertons, Hood, Kivlin, Kowert & Goetzel, P.C.

(57) ABSTRACT

A multiplier unit may be configured to generate a final approximation of an iterative arithmetic operation performed on two operands. Circuitry coupled to the multiplier unit may perform a shift operation and a mask operation on the final approximation to generate shifted and un-shifted approximations, respectively. The circuitry may generate a first remainder using the un-shifted approximation and a sign value of a second remainder using the first remainder. Using the sign value of the second remainder, the circuitry may perform a rounding operation on the shifted approximation to generate a final answer.

11 Claims, 6 Drawing Sheets

ITERATIVE DIVISION WITH REDUCED LATENCY

BACKGROUND

Technical Field

Embodiments described herein relate to integrated circuits, and more particularly, to techniques for performing iterative arithmetic operations within integrated circuits.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like.

Processors include various functional blocks, each with a dedicated task. For example, a processor may include an instruction fetch unit, a memory management unit, and an arithmetic logic unit (ALU). An instruction fetch unit may prepare program instructions for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data Some arithmetic operations, such as, e.g., division, may involve iterative calculations performed over several computing cycles. Multiple iterations may be performed until a desired level of accuracy is achieved. In some cases, additional circuitry may be added to an ALU to support the iterative calculations.

SUMMARY OF THE EMBODIMENTS

Various embodiments of a multiplier unit are disclosed. Broadly speaking, a circuit and a method are contemplated in which a multiplier unit may be configured to generate a final approximation of an iterative arithmetic operation performed on two operands and circuitry coupled to the multiplier unit may be configured to receive the final approximation and perform a shift operation on the final approximation to generate a shifted approximation. The circuitry may be further configured to perform a mask operation on the final approximation to generate an un-shifted approximation and generate a first remainder value using the un-shifted approximation and the two operands. Additionally, the circuitry may be configured to generate a sign value of a second remainder value dependent upon the first remainder value and perform a rounding operation on the shifted approximation dependent upon the sign value to generate a final answer.

In one embodiment, the circuitry may be further configured to invert the sign of the first remainder value when generating the sign value of the second remainder value. In another non-limiting embodiment, the final approximation may include M data bits, where M is a positive integer.

In a further embodiment, when performing the mask operation on the final approximation, the circuitry may be further configured to set a trailing number of bits in the final approximation to zero, where the trailing number of bits is dependent upon a precision and a shift value, wherein the shift value is a positive integer less than M, and where the precision is a positive integer less than M.

BRIEF DESCRIPTION OF THE DRAWINGS

The following detailed description makes reference to the accompanying drawings, which are now briefly described.

Figure 1:
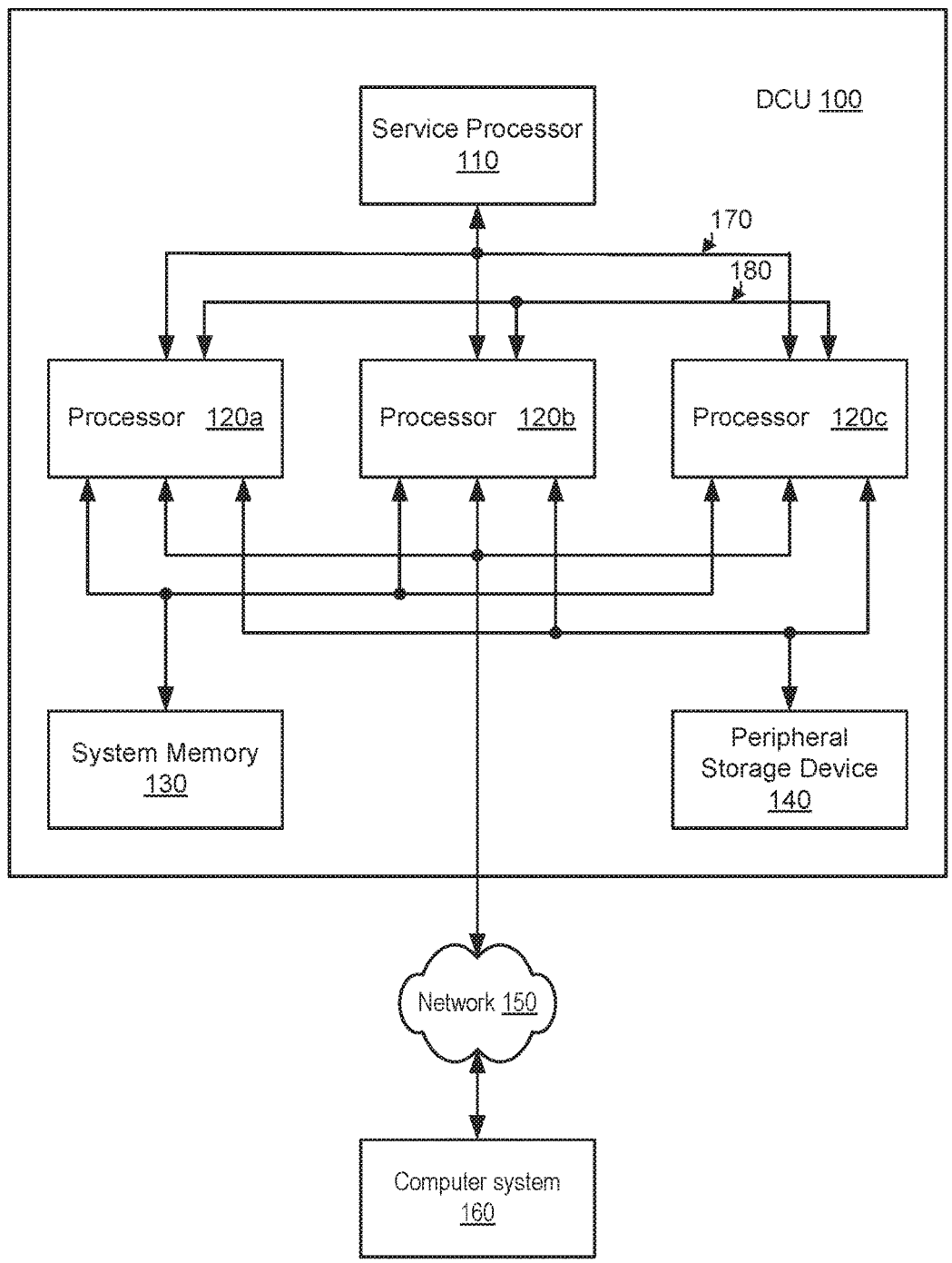
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In a computing system, arithmetic operations may be performed by an arithmetic logic unit (ALU) of a processor. The ALU may contain dedicated logic circuits, such as, e.g., an adder or multiplier, that are designed to perform certain arithmetic functions in an iterative fashion. After a number of iterations of a particular arithmetic operation, a final approximation may be generated. In order to determine the answer to the particular arithmetic operation, a rounding operation may be performed on the final approximation.

As part of the final operations leading up to the rounding operation, mask and shift operations may be performed on the final approximation in order to put the number into the proper bit format. The above-referenced combination of mask and shift operations may consume numerous clock cycles, resulting in a latency to achieve the final result, as well as the power consumption associated with operating the circuits over the clock cycles. The embodiments illustrated in the drawings and described below may provide techniques for improving latency and reducing power consumption of some arithmetic operations performed in an iterative fashion.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, system processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

Figure 2:
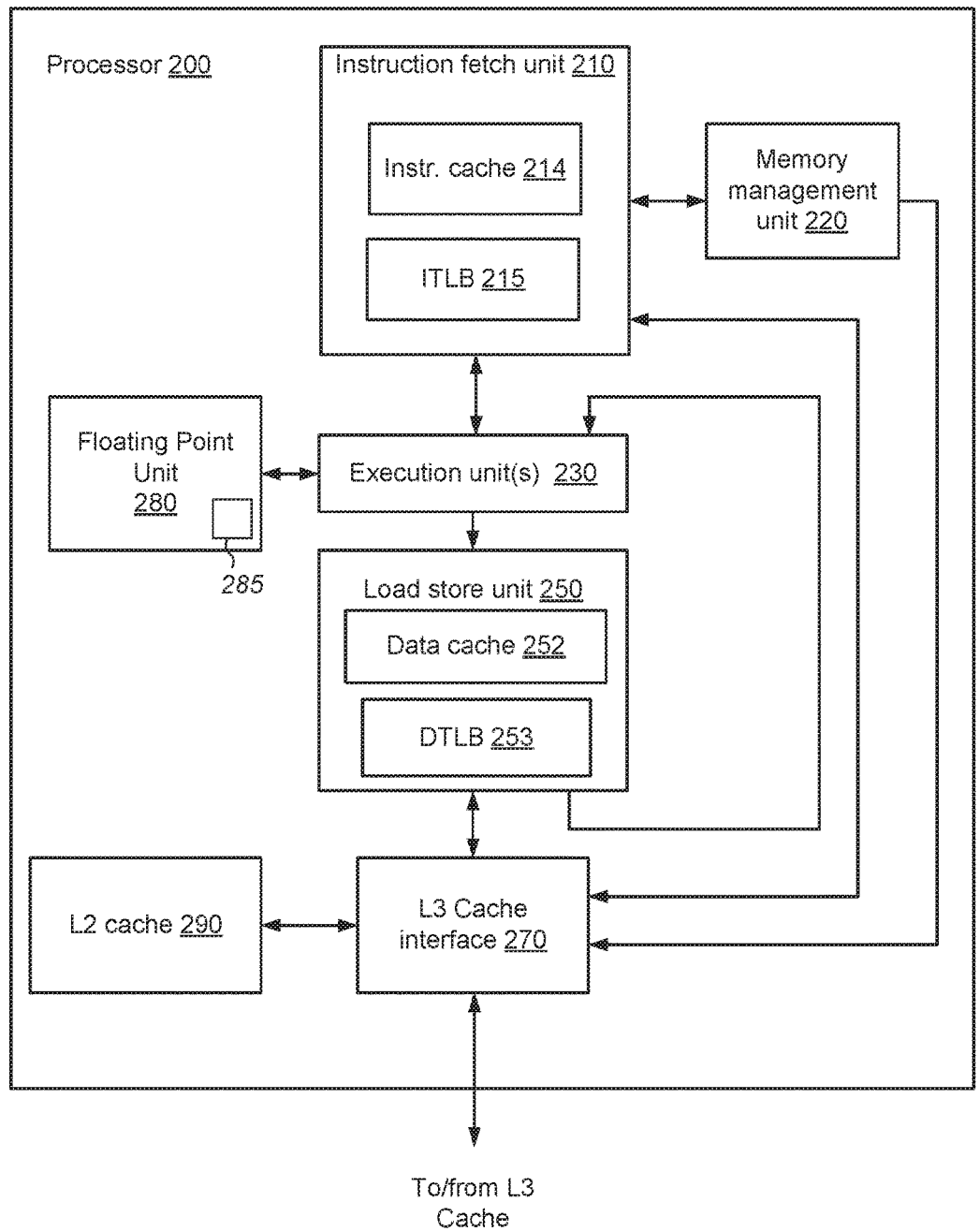
FIG. 2 illustrates an embodiment of a processor.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core A possible embodiment of processor is illustrated in FIG. 2. In the illustrated embodiment, processor 200 includes an instruction fetch unit (IFU) 210 coupled to a memory management unit (MMU) 220, a L3 cache interface 270, a L2 cache memory 290, and one or more of execution units 230. Execution unit(s) 230 is coupled to load store unit (LSU) 250, which is also coupled to send data back to each of execution unit(s) 230. Additionally, LSU 250 is coupled to L3 cache interface 270, which may in turn be coupled a L3 cache memory.

Instruction fetch unit 210 may be configured to provide instructions to the rest of processor 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction fetch unit 210 further includes an instruction cache 214. In one embodiment, IFU 210 may include logic to maintain fetch addresses (e.g., derived from program counters) corresponding to each thread being executed by processor 200, and to coordinate the retrieval of instructions from instruction cache 214 according to those fetch addresses.

In one embodiment, IFU 210 may be configured to maintain a pool of fetched, ready-for-issue instructions drawn from among each of the threads being executed by processor 200. For example, IFU 210 may implement a respective instruction buffer corresponding to each thread in which several recently-fetched instructions from the corresponding thread may be stored. In some embodiments, IFU 210 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 210 may be configured to further prepare instructions for execution, for example by decoding instructions, detecting scheduling hazards, arbitrating for access to contended resources, or the like. Moreover, in some embodiments, instructions from a given thread may be speculatively issued from IFU 210 for execution. Additionally, in some embodiments IFU 210 may include a portion of a map of virtual instruction addresses to physical addresses. The portion of the map may be stored in Instruction Translation Lookaside Buffer (ITLB) 215.

Execution unit 230 may be configured to execute and provide results for certain types of instructions issued from IFU 210. In one embodiment, execution unit 230 may be configured to execute certain integer-type instructions defined in the implemented ISA, such as arithmetic, logical, and shift instructions. It is contemplated that in some embodiments, processor 200 may include more than one execution unit 230, and each of the execution units may or may not be symmetric in functionality.

Floating point unit (FPU) 280 may be configured to execute and provide results for certain floating-point and graphics-oriented instructions defined in the implemented ISA. For example, in one embodiment FPU 280 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Depending on the implementation of FPU 280, may include multiplier unit 285. As described below in more detail, multiplier unit 285 may be employed in an iterative fashion to approximate values for some arithmetic operations, such as, division, for example.

Load store unit 250 may be configured to process data memory references, such as integer and floating-point load and store instructions. In some embodiments, LSU 250 may also be configured to assist in the processing of instruction cache 214 misses originating from IFU 210. LSU 250 may include a data cache 252 as well as logic configured to detect cache misses and to responsively request data from L2 cache 290 or a L3 cache partition via L3 cache partition interface 270. Additionally, in some embodiments LSU 350 may include logic configured to translate virtual data addresses generated by EXUs 230 to physical addresses, such as Data Translation Lookaside Buffer (DTLB) 253.

It is noted that the embodiment of a processor illustrated in FIG. 2 is merely an example. In other embodiments, different functional block or configurations of functional blocks are possible and contemplated.

Figure 3:
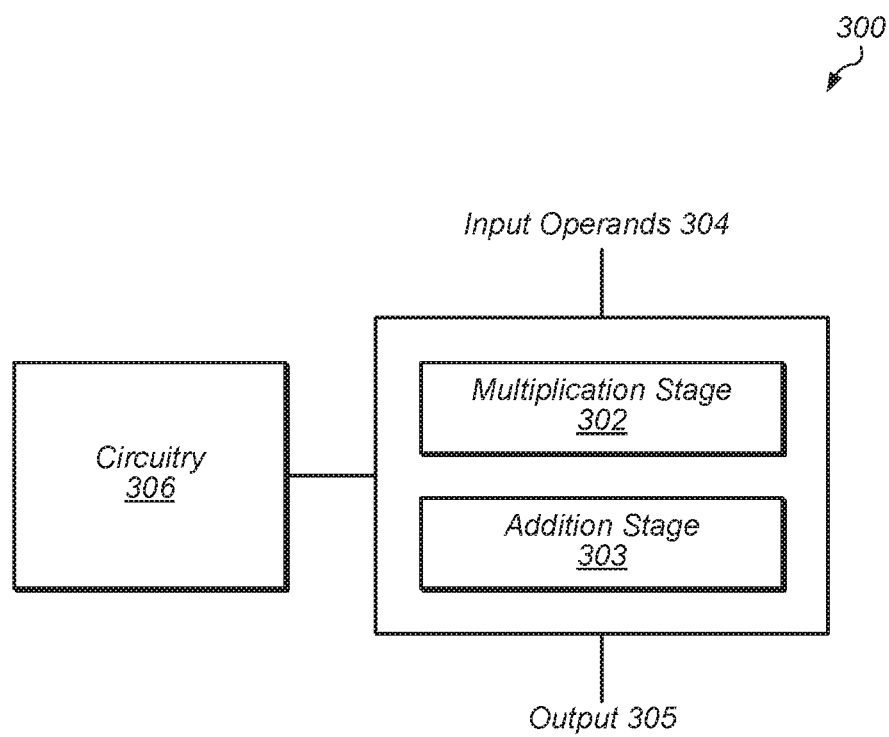
FIG. 3 illustrates an embodiment of a multiplier unit.

Turning to FIG. 3, an embodiment of multiplier unit is illustrated. In some embodiments, multiplier unit 300 may correspond to multiplier unit 285 as illustrated in FIG. 2. In the illustrated embodiment, multiplier unit 300 includes multiplication stage 302, addition stage 303, and circuitry 306. Multiplier unit 300 may, in some embodiments, be used to implement one of various algorithms, such as Newton-Raphson or Goldschmidt, for example. In various embodiments, multiplier unit 300 may be configured to produce an approximation of a quotient of two floating point numbers, a quotient of two integer numbers.

Each of multiplication stage 302, and addition stage 303 may be configured to operate on at least two operands, and may be designed in accordance with one of various multiplier architectures. For example, multiplication stage 302 of the aforementioned stages may employ Wallace Trees, or other suitable multiplier algorithm. In various embodiments, multiplier 300 may be configured to allow operands of any suitable length, such as, e.g., integer or floating point operands.

As described below in more detail, when multiplier unit 300 is used to perform an iterative operation such as, e.g., floating point division or integer division, input operands 304 are received and normalized by multiplier unit 300. Multiplication stage 302 may be used to perform repeated multiplication operations in order to generate a final approximation for the desired quotient. When a desired level of precision has been achieved, circuitry 306 may format a remainder generated by the iterative division algorithm. Circuitry 306 may also be configured to generate a sign of remainder, and perform a final rounding operation to generate a final answer, which may then be sent to output 305.

It is noted that the embodiment illustrated in FIG. 3 is merely an example. In other embodiments, different numbers of stages and different configurations of functional stages are possible and contemplated As mentioned above, multiplier units, included in computing systems, such as, e.g., DCU 100, may be used to execute iterative division algorithms for either floating-point or integer operands. During each iteration, the precision of the computed answer increases. The iterations may continue until a desired level of prevision is achieved. It is noted that although the following discussion is generally directed towards the Goldschmidt algorithm, in other embodiments any suitable algorithm, which generates an approximation of the final answer through an iterative process, may be employed. The final approximation of such an algorithm may be generically described as shown in equation 1 where A and B are normalized input operands and precision is the desired precision of the final approximation generated by the iterative function $f$. In various embodiments, the iterative function $f$ generates an m-bit value where m is implementation specific and may be greater than the value of precision.

$$\text{final\_approximation} = f(A, B, \text{precision}) \quad (1)$$

Figure 4:
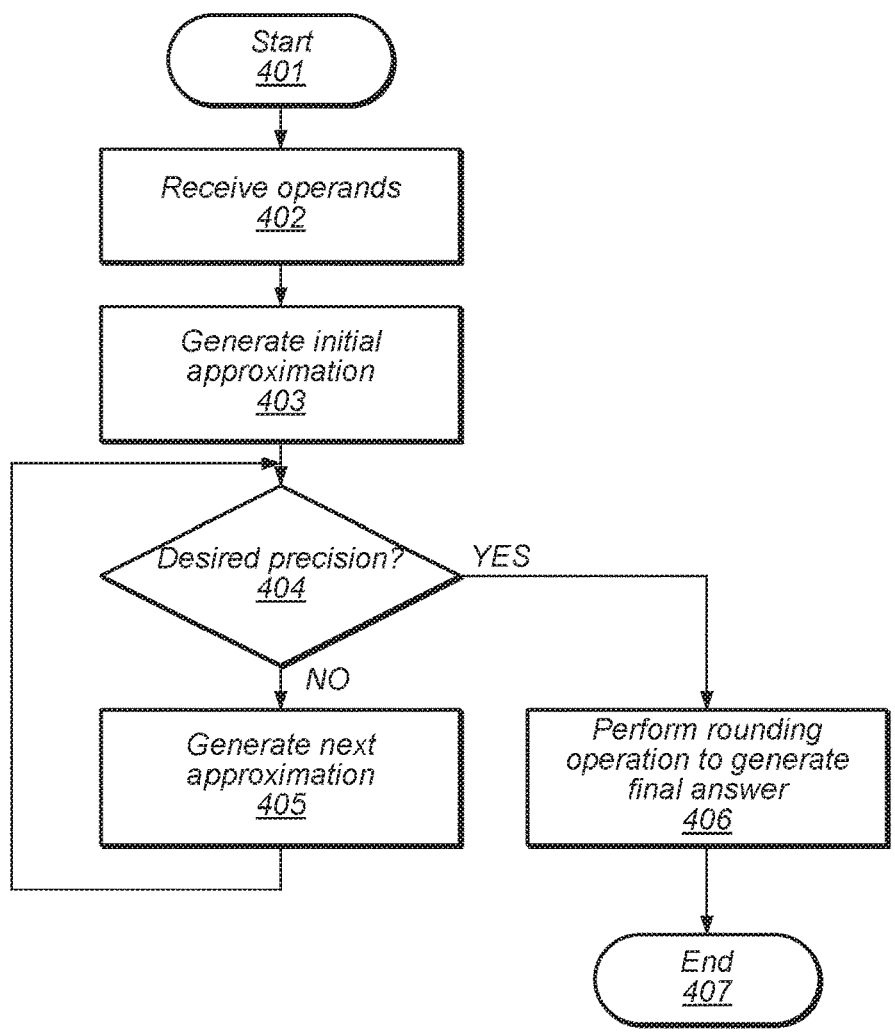
FIG. 4 depicts a flow diagram illustrating an embodiment of a method for performing an iterative arithmetic operation.

An embodiment of a method for performing an iterative division operation is depicted in the flow diagram of FIG. 4. The method begins in block 401. A multiplier unit, such as, e.g., multiplier unit 300 as illustrated in FIG. 3, may then receive input operands (block 402). As noted above, the input operands may be either floating-point or integer values. As show in equation 1, the arguments to the iterative function $f$ include normalized inputs. As used as described herein, a normalized value is a value whose leading value is a "1." In cases where the input operands are not normalized, the multiplier unit may normalize the input operands prior to starting the iterative process. To normalize the input operands A and B, a left shift may be performed on each operand as depicted in equations 2 and 3.

$$A = \text{left\_shift}(A\text{in}, a\text{cnt}) \quad (2)$$

$$B = \text{left\_shift}(B\text{in}, b\text{cnt}) \quad (3)$$

In equations 2 and 3, Ain and Bin represent received input operands, and acnt and bcnt represent a number of bits by which to left shift Ain and Bin, respectively, in order to normalize Ain and Bin. In other words, acnt and bcnt represent the number of leading zeros in the m-bit representations of Ain and Bin.

The multiplier unit may then generate an initial approximation (block 403). In some embodiments, an initial approximation of the reciprocal of the divisor may be generated. The initial approximation may, in various embodiments, be retrieved from a look-up table or may be calculated using any other suitable method. The method may then depend on the desired level precision (block 404).

If the current level of precision is less than the desired value of precision, then a next approximation is generated (block 405).

If, however, the current level of precision is greater than or equal to the desired level of precision, then the multiplier unit may perform a rounding operation in order to generate the final answer (block 406). As described below, in more detail, the rounding operation may include determining whether the final approximation of the quotient is less than, equal to, or greater than the exact value of the quotient. Once the rounding operation has been completed, the method may conclude in block 407.

It is noted that the embodiment of the method depicted in the flow diagram of FIG. 4 is merely an example. In other embodiments, different operations and different orders of operations may be employed.

In iterative operations, before a rounding operation, such as the rounding operation described above in regard to FIG. 4, can be performed, other operations may be performed to generate intermediate data and/or format numbers to be used in the rounding operation.

Figure 5:
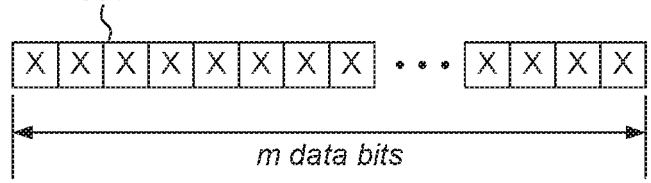
FIG. 5 depicts a chart illustrating masking of the final approximation of an iterative arithmetic operation
Figure 5:
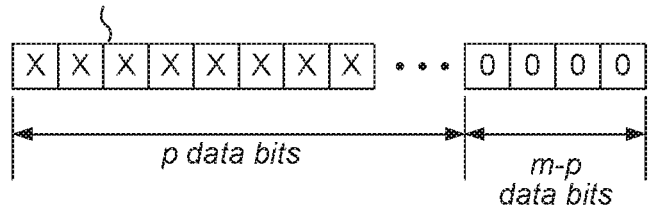

One such intermediate value is q_approx, which is an approximation of q_exact, the exact answer of the iterative operation in the proper bit format. As shown in equation 4, generating q_approx includes performing a masking operation on a shifted version of final_approximation. The masking operation may include setting a number of trailing bits in the shifted version final_approximation to zero. The number of trailing bits that are set to zero may, in various embodiments, be dependent upon the desired precision. As illustrated in FIG. 5, an example of a masking operation to generate q_approx is depicted. In the illustrated embodiment, Final Approximation 501 includes m data bits. The value of q Approximation 502 includes p data bits, and m-p data trailing data bits whose values are zeros.

$$q\_approx = mask(right\_shift(final\_approximation, shift\_amount)) \quad (4)$$

The value of p may be determined based on the desired precision of the iterative operation. In some embodiments, when the guard bit is included, the value of p may be equal to one plus the value of precision. Alternatively, if the guard bit is excluded, then the value of p may be equal to the value of precision. For example, in the case of single precision division, p may be equal to 25, and when performing double-precision division including the guard bit, the value of p may be equal to 54. In the case of 64-bit integer division, p may be equal to 65 when including the guard bit and p may be equal to 64 when the guard bit is excluded.

The shifted version of final_approximation may be used so that final_approximation is in the proper bit format. For example, in the case of integer division with a nonzero result or floating-point division with a denormal result, the right shift may be performed. Alternatively, in floating-point division, the virtual fractional point in final_approximation is, by default, just after the leading bit. To represent a correct denormal result, however, the virtual fractional point may have to be moved to left, which may be accomplished through a right shift of final_approximation.

In the case of 64-bit integer division, the virtual fractional point in final_approximation is located, by default, just after the first 64 bits. In order to represent the correct integer quotient, the virtual fractional point may have to be moved to the left, which may be implemented as a right shift of final_approximation.

Such right shifts ensure that the virtual fractional point will be in the proper location. In integer division, the number of bits to be shifted is dependent upon acnt, bcnt, and m, while in floating-point division, the number of bits to be shifted may depend on additional values, such as the type of operation, values of exponents, and the like.

The right shift operations described above may be implemented in one of various methods. For example, in some embodiments, circuitry 306 may employ a shift register or other suitable circuit to perform the bit shifts. It is noted that the number of bits to shift may be computed some number of clock cycles prior to the actual shift being performed. When the right shift operations are performed, bits that are "shifted out" may be truncated and any new bits shifted in may be set to zero values.

The exact answer, q_exact, may depend on m and shift_amount as illustrated in equations 5 and 6. It is noted that since $A2^{m-1}$ has m−1 trailing zeros, q_exact, like q_approx, has m non-fractional bits.

$$q\_exact = \frac{A\_shifted}{B} \quad (5)$$

$$A\_shifted = right\_shifted(A2^{m-1}, shift\_amount) \quad (6)$$

For proper rounding, it is important to determine whether q_approx is less than, equal to, or greater than q_exact. To determine the relationship between q_approx and q_exact, a remainder value may be determined. As depicted in equation 7, the remainder may be calculated by taking the difference between the A_shifted and the product of q_approx and B.

$$remainder = A\_shifted - q\_approx*B \quad (7)$$

In some embodiments, an alternative value, remainderBar, may be calculated instead of remainder. By employing a fused multiply add module, remainderBar may be easier to compute than remainder. As depicted in equation 5, remainderBar may be calculated by subtracting the A_shifted from the product of q_approx and B. Moreover, since B>0, sign(remainder)=sign(−remainderBar).

$$remainderBar = q\_approx*B - A\_shifted \quad (8)$$

In various embodiments, calculating A_shifted and q_approx uses three clock cycles, while calculating remainderBar and the sign of remainderBar consumes four clock cycles. Since A_shifted and q_approx must be determined prior to calculating remainderBar and the sign of remainderBar, the entire process may take up to seven clock cycles. An additional clock cycle may be needed to perform the final rounding operation.

Figure 6:
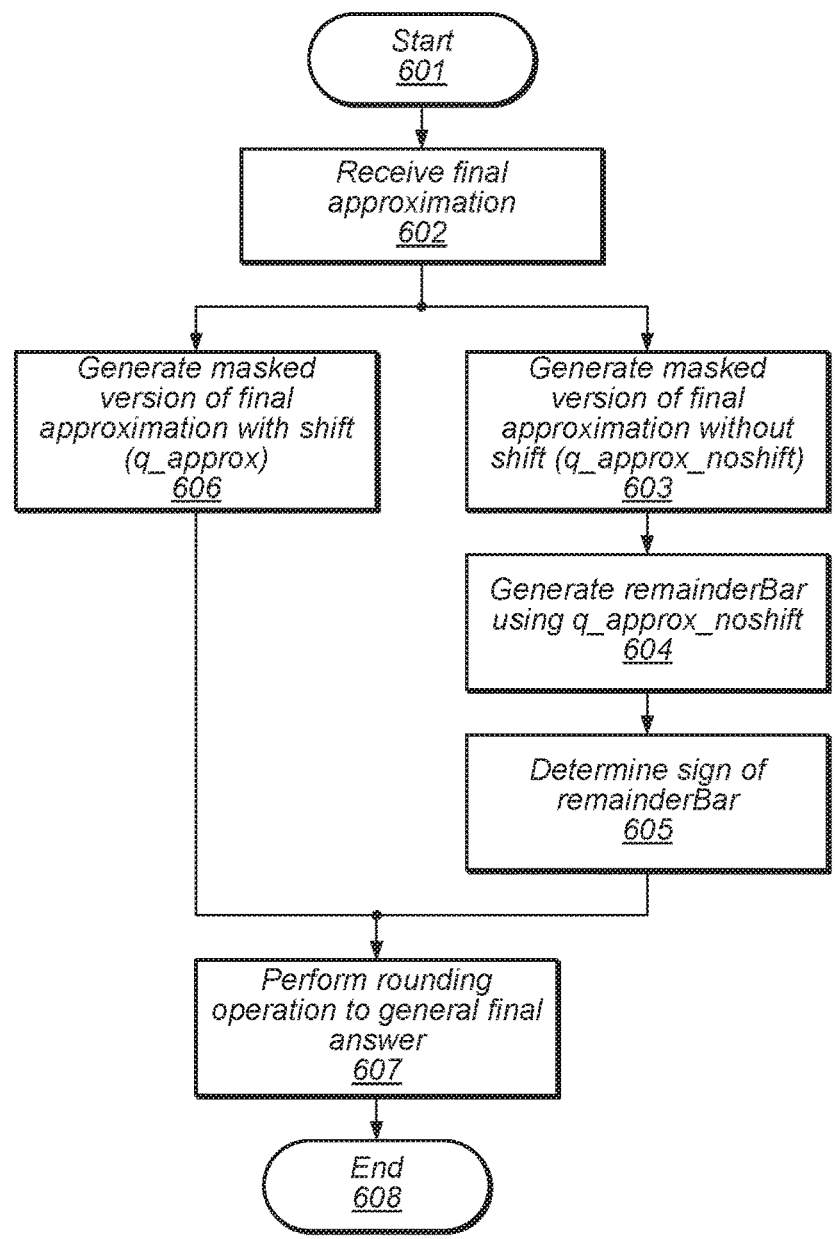
FIG. 6 depicts a flow diagram illustrating an embodiment of a method for performing the final steps of an iterative arithmetic operation.

Turning to FIG. 6, a flow diagram depicting an embodiment of method for performing the final steps of an arithmetic operation is illustrated. In various embodiments, the number of clocks cycles needed to perform the operations included in the flow diagram may be less than the number of clock cycles described above. By using less clock cycles, the illustrated method may reduce latency, power consumption, and may simplify some circuitry. It is noted that, in some embodiments, the method illustrated in the flow diagram of FIG. 6, may correspond to one or more operations included in block 406 as depicted in FIG. 4. Referring collectively to the embodiment of FIG. 3 and the flow diagram of FIG. 6, the method begins in block 601.

Circuitry 306 may then receive the final_approximation from Multiplication Stage 302 and Addition Stage 303 (block 602). In various embodiments, the final_approximation may be for a division operation, square root operation, or any suitable operation. Once the final_approximation has been received, calculation of q_approx may begin (block 606). As described above in regard to equation 4, calculation of q_approx may include both a mask operation and a shift operation.

In parallel with the calculation of q_approx, Circuitry 306 may also generate a value for q_approx_noshift (block 603). As depicted in equation 9, calculating q_approx_noshift does not include a shift operation.

$$q\_approx\_noshift = \quad (9)$$
$$mask(final\_approximation, max(p - shift\_amount, 0))$$

A value for remainderBar may then be generated using q_approx_noshift and $A2^{m-1}$ (block 604). As depicted in equation 10, the calculation is similar to the preceding calculation of remainderBar except q_approx_noshift is used instead of q_approx and $A2^{m-1}$ is used instead of A_shifted. The sign of remainderBar may then be determined (block 605).

$$remainderBar = q\_approx\_noshift*B - A2^{m-1} \quad (10)$$

Using the sign of remainderBar and the value of q_approx generated in block 606, Circuitry 306 may then perform a final rounding operation (block 607). The method may then conclude in block 608. By generating remainderBar using q_approx_noshift instead of q_approx, and $A2^{m-1}$ instead of A_shifted, the operations included in blocks 603-606 may be performed in parallel with the operations included in block 606. As a result, in some embodiments, the number of clock cycles needed to perform the final operations may be reduced. For example, in various embodiments, three clock cycles may be eliminated, resulting in the final operations only consuming four clock cycles.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an arithmetic logic unit that includes:
        a multiplier stage configured to generate, upon reaching a specified level of precision, a final approximation of an iterative arithmetic operation performed on at least two operands; and
        rounding circuitry coupled to the multiplier stage, wherein the rounding circuitry is configured to:
            receive the final approximation;
            perform, using a shift register, a shift operation on the final approximation to generate a shifted approximation;
            in parallel with performing the shift operation on the final approximation:
                perform a mask operation on the final approximation to generate an un-shifted approximation;
                generate a first remainder value using the un-shifted approximation and the two operands;
                generate a sign value of a second remainder value using the first remainder value; and
            perform a rounding operation on the shifted approximation using the sign value to generate a final answer of the iterative arithmetic operation.

2. The apparatus of claim 1, wherein to generate the sign value of the second remainder value, the rounding circuitry is further configured to invert a sign of the first remainder value.

3. The apparatus of claim 1, wherein to perform the mask operation on the final approximation, the rounding circuitry is further configured to set a trailing number of bits in the final approximation to zero, wherein the trailing number of bits is based on a precision and a shift value, wherein the shift value is a positive integer less than a number of data bits included in the final approximation, and wherein the precision is a positive integer less than the number of data bits included in the final approximation.

4. The apparatus of claim 3, wherein to generate the first remainder value using the un-shifted approximation and the two operands, the rounding circuitry is further configured to determine a difference between a product of the un-shifted approximation and a first operand of the two operands and a second product.

5. The apparatus of claim 3, wherein the rounding circuitry is further configured to perform the rounding operation using the precision.

6. The apparatus of claim 1, wherein the rounding circuitry is further configured to perform a different mask operation on results of the shift operation.

7. An apparatus, comprising:
    an arithmetic logic unit configured to perform an arithmetic operation on at least two operands, wherein the arithmetic logic unit includes:
        a multiplier circuit configured to used the at least two operands to iteratively generate a final approximation for the arithmetic operation in response to reaching a specified level of precision; and
        a rounding circuit configured to round the final approximation to generate a final result for the arithmetic operation, wherein the rounding circuit is configured to generate the final result by operating, in parallel, on both shifted and unshifted versions of the final approximation, thereby reducing latency of the arithmetic operation.

8. The apparatus of claim 7, wherein to generate the final result, the rounding circuit is further configured to perform a mask operation on the final approximation to generate the unshifted version of the final approximation.

9. The apparatus of claim 8, wherein to perform the mask operation on the final approximation, the rounding circuit is further configured to set a trailing number of bits in the final approximation to zero, wherein the trailing number of bits is based on a precision and a shift value, wherein the shift value is a positive integer less than a number of data bits included in the final approximation, and wherein the precision is a positive integer less than the number of data bits included in the final approximation.

10. The apparatus of claim 9, wherein the rounding circuit is further configured to determine a difference between a product of the unshifted version of the final approximation and a first operand of the two operands and a second product.

11. The apparatus of claim 9, wherein the rounding circuit is further configured to round the final approximation using the precision.

* * * * *

UNITED STATES PATENT AND TRADEMARK OFFICE
CERTIFICATE OF CORRECTION

PATENT NO. : 10,289,386 B2
APPLICATION NO. : 15/122724
DATED : May 14, 2019
INVENTOR(S) : Ebergen et al.

Page 1 of 1

It is certified that error appears in the above-identified patent and that said Letters Patent is hereby corrected as shown below:

In the Specification

In Column 1, Line 31, delete "data" and insert -- data. --, therefor.

In Column 5, Line 52, delete "contemplated" and insert -- contemplated. --, therefor.

Signed and Sealed this
Twenty-first Day of July, 2020

Andrei Iancu
*Director of the United States Patent and Trademark Office*